Dec. 2, 1947.  A. G. LARSON  2,431,759
STABILIZER FOR PRESSURE FLUID SERVOMOTORS
Filed March 30, 1944  2 Sheets-Sheet 1
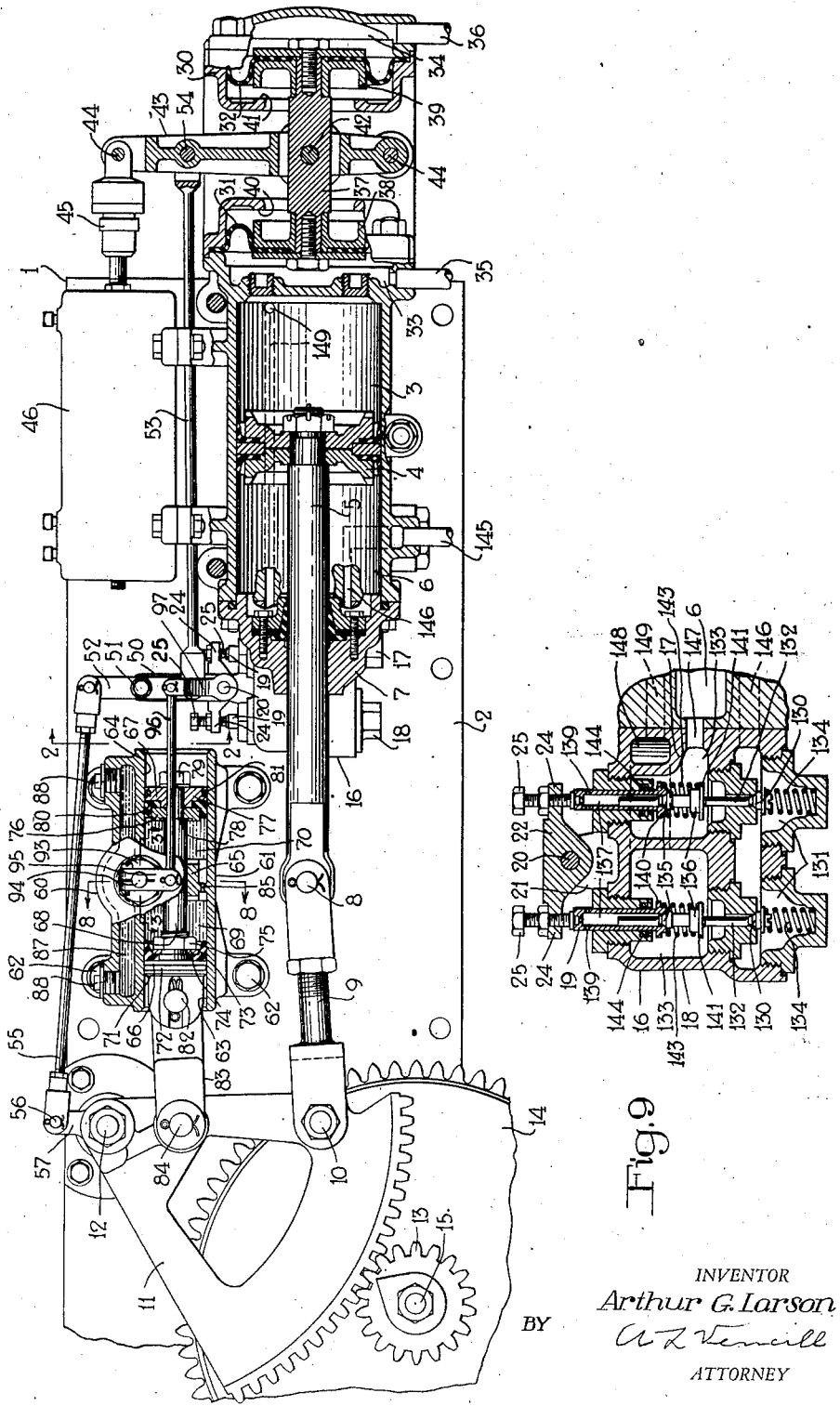
INVENTOR
*Arthur G. Larson*
BY
ATTORNEY Dec. 2, 1947.  A. G. LARSON  2,431,759
STABILIZER FOR PRESSURE FLUID SERVOMOTORS
Filed March 30, 1944  2 Sheets-Sheet 2
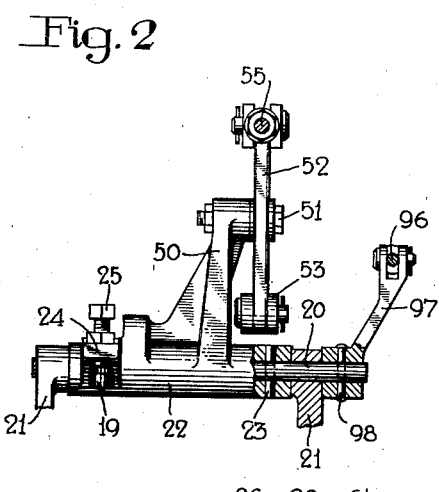
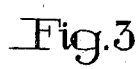
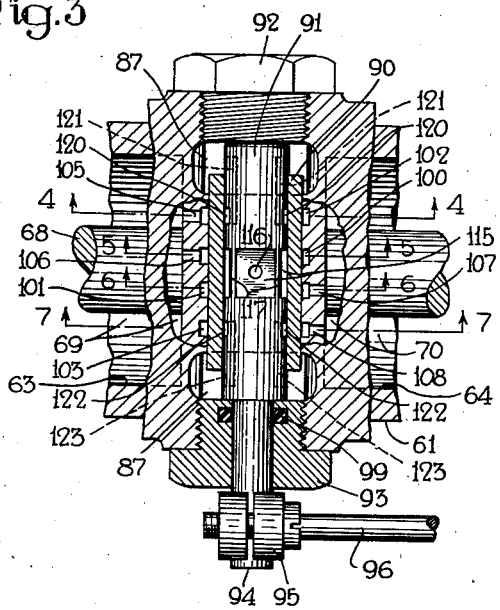
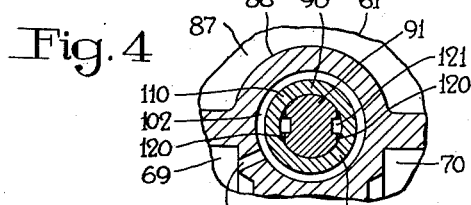
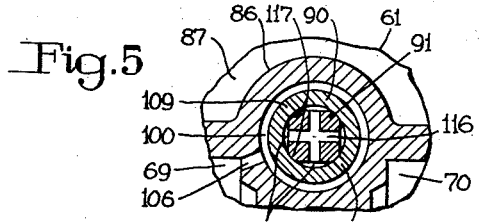
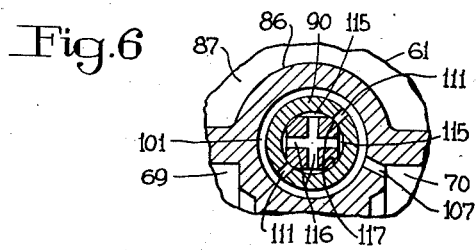
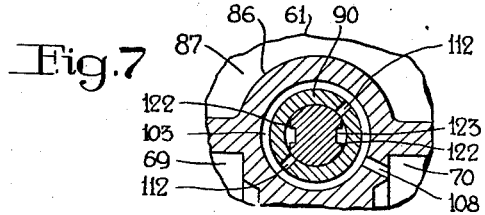
INVENTOR
Arthur G. Larson
BY
ATTORNEY Patented Dec. 2, 1947

2,431,759

UNITED STATES PATENT OFFICE 2,431,759

STABILIZER FOR PRESSURE FLUID SERVOMOTORS

Arthur G. Larson, Forest Hills, Pa., assignor to The Westinghouse Air Brake Company, Wilmerding, Pa., a corporation of Pennsylvania Application March 30, 1944, Serial No. 528,691

3 Claims. (Cl. 121—41)

This invention relates to stabilizers for control apparatus and more particularly to means for preventing unwanted movement of an operating or operated member.

In my copending application Serial No. 470,803, filed December 31, 1942, and issued as Patent No. 2,418,129 on April 1, 1947, there is disclosed a fluid motor of the so-called follow-up type embodying a power piston and a regulating valve device for establishing differentials in fluid pressures on said piston for moving same, and for destroying said differentials to stop movement of the piston. Pilot means in the form of a piston is arranged to actuate the regulating valve device to create the differentials in fluid pressures on the power piston, while the power piston is arranged to actuate the regulating device to destroy the differentials in fluid pressures upon the power piston attaining a position corresponding to operation of the pilot means.

In fluid motors of this general type it is desirable that the power piston promptly move to and stop in a position determined by operation of the pilot means. However, in case the resistance to movement of the device operated by the power piston is variable, such for instance as to require a greater differential in pressures on the piston to move it during a portion of its stroke than may exist near the position in which it is desired that the power piston will stop, the differential in pressures acting on the piston, aided by inertia of said piston and possibly of the parts being operated, will tend to cause the power piston to over travel and consequently move the device being operated past the position in which it is desired that it be stopped. If the power piston should thus over-travel it will operate the regulating device to reverse the differential in fluid pressures on the power piston and thus cause said piston to reverse its direction of movement. This reversal of the power piston may then result in over-travel in the opposite direction, and consequently another reversal in the direction of movement of the power piston may result. Such oscillation of the power piston is undesirable particularly where it is desired to position a device with a relatively high degree of accuracy.

One object of the invention is therefore the provision of means arranged to obviate the above difficulty.

Another object of the invention is the provision of a stabilizer for a reciprocatory piston or the like so constructed and arranged as to allow relatively free movement of the piston from one position substantially to another or selected position, and which is effective upon the piston attaining the selected position to stop said piston and substantially lock same against movement out of the selected position.

I attain these objects by the use of a novel hydraulic dash-pot or stabilizer the piston means of which is connected to move with the power piston. The stabilizer piston means is oppositely subject to liquid in two chambers which are in constant communication through a small port, and a by-pass valve is provided to open and close a relatively large communication between said chambers. This by-pass valve is connected for movement with the pilot means and is so designed as to open the communication controlled thereby upon movement of the pilot means to effect operation of the regulating valve device to establish a differential in fluid pressures on the power piston, whereby the stabilizer piston means may move relatively freely with the power piston as the latter moves toward a selected position. Upon cessation of movement of the pilot means, the continuing movement of the power piston will then actuate the by-pass valve to close the communication controlled thereby; the by-pass valve effecting closure of said communication just before the power piston attains the selected position.

It will be apparent that if closure of the communication controlled by the by-pass valve completely bottled the liquid effective on the stabilizer piston means, the power piston would stop suddenly and impose severe shock, not only on itself, but also on associated mechanism. I avoid such shock however by use of the port constantly connecting the two chambers, whereby upon closure of the by-pass valve the relatively small flow of liquid still possible from one of the chambers to the other will arrest movement of the power piston without undue shock. Further movement of the power piston to its selected position will then be so retarded as to insure operation of the regulating valve device to substantially equalize the opposing fluid pressures on the power piston by the time the power piston attains its selected position. The differential in pressures thus being destroyed on the power piston when it attains the selected position and further movement being opposed by the dash-pot or stabilizer, said power piston will stop moving and the stabilizer will then hold it against unwanted movement out of the selected position.

Other objects and advantages will be apparent from the following more detailed description of the invention.

In the accompanying drawings; Fig. 1 is a side view, partly in section, of a fluid motor of the follow-up type and of the stabilizer embodying the invention; Figs. 2 and 3 are sectional views taken substantially on the lines 2—2 and 3—3 in Fig. 1; Figs. 4 to 7 are sectional views taken on the lines 4—4, 5—5, 6—6, and 7—7, respectively, in Fig. 3; Fig. 8 is a sectional view taken substantially on the line 8—8 in Fig. 1; and Fig. 9 is a sectional view of a pressure regulating valve device associated with the motor shown in Fig. 1 and taken in a plane parallel to but back of the plane of the section in Fig. 1.

Description

In the drawings, the reference numeral 1 indicates a fluid motor which for the purpose of illustrating one use of the invention, may be substantially like that disclosed in the aforementioned pending application, in view of which the following description of the motor will be limited to only those details necessary to a full and complete understanding of the invention.

The fluid motor 1 is secured to a mounting plate 2 and comprises a cylinder containing a power piston 4 having at one side a pressure chamber 3. The piston 4 has a rod 5 projecting therefrom through a pressure chamber 6 at the opposite side and a suitable opening in a pressure head 7 closing the open end of said chamber. The outer end of the rod 5 is connected by a pin 8 to one end of a link 9. The other end of link 9 is connected by a pin 10 to a gear sector 11 at a point remote from a pin 12 secured to the mounting plate 2. The pin 12 constitutes a fixed fulcrum upon which the gear sector 11 is mounted to turn.

The teeth of the gear sector 11 have driving engagement with teeth on a gear 13 which is connected to a sprocket wheel 14. Gear 13 and sprocket wheel 14 are mounted for rotation in unison on a pin 15 carried by the mounting plate 2. The sprocket wheel 14 may be connected by a chain (not shown) to a device which it is desired to operate or move to different selected positions. It will be apparent that movement of piston 4 in one direction in its cylinder will turn the sprocket wheel 14 in one direction, while movement of said piston in the opposite direction in said cylinder 3 will turn said sprocket wheel in the opposite direction. By selecting the direction and limiting the extent of movement of the power piston 4 selective positioning of the sprocket wheel 14 and of the device operated thereby may therefore be obtained.

Associated with the pressure head 7 is a fluid pressure regulating valve device 16 comprising pressure control valve devices 17 and 18 for controlling the supply and release of fluid under pressure to and from the respective chambers 6 and 3 at opposite sides of the power piston 4.

Both of the pressure regulating valve devices 17 and 18 may be identical in construction, each comprising, as shown in Fig. 9, a fluid pressure supply valve 130 contained in a chamber 131 and having a fluted stem 132 extending through a bore in the casing into a chamber 133, said valve being provided to control the flow of fluid under pressure from chamber 131 to chamber 133. A spring 134 acts on each supply valve 130 for urging it toward its closed position.

Each of the regulating valve devices 17 and 18 further comprises a fluid pressure release valve 135 formed on a member 136 which bears against the end of the respective fluid pressure supply valve stem 132. Each release valve 135 has a fluted stem mounted to slide in a bore 137 provided in a plunger or sleeve 19 which is slidably mounted in the casing. In chamber 133 each plunger has a seat for engagement by the respective release valve which is thus arranged to control communication between said chamber and bore 137. Each plunger 19 extends beyond the exterior of the casing and is provided with one or more radial bores 139 connecting the respective bore 137 to atmosphere. Further each plunger 19 is provided in the release valve chamber 133, with a collar 140 encircling the release valve seat, while a similar collar 141 is provided on the end of member 136 engaging the supply valve stem 132, and interposed between and bearing against these collars in each valve device is a precompressed spring 143 acting to urge the plunger 19 in a direction out of seating engagement with the release valve 135. The casing is provided with an annular groove encircling and open to the peripheral surface of each plunger 19 and in this groove is disposed a resilient ring 144 providing sealing contact between the casing and said plunger for preventing leakage of fluid under pressure from the release valve chamber 133 past said plunger to atmosphere.

The supply valve chamber 131 is common to both regulating valve devices 17 and 18 and is adapted to be constantly supplied with fluid under pressure from any suitable source by way of a pipe 145 and a passage 146. The release valve chamber 133 in the regulating valve device 17 is in constant communication with the power piston chamber 6 through a passage 147, while the corresponding chamber in the regulating valve device 18 is in constant communication with the power piston chamber 3 through a passage 148 passing back of the release valve chamber 133 in the regulating valve device 17 and connected to a passage 149 which extends through the power cylinder and opens to chamber 3 at the outer end thereof.

In each of the regulating valve devices 17 and 18, the supply valve 130, release valve 135 and plunger 19 are arranged in coaxial relation, and these parts in the two valve devices are spaced apart and arranged in parallel relation.

A shaft 20 arranged midway between the two plungers 19 is journaled adjacent its opposite ends in spaced brackets 21 extending from the pressure head 7. Between the brackets 21 a sleeve-like member 22 mounted on shaft 20, and as best shown in Fig. 2, is secured by a pin 23 to turn with said shaft. The member 22 has two oppositely extending arms 24, one disposed over each of the plungers 19. In the end of each arm 24 is secured an adjusting screw 25 for engaging the respective plunger 19. For operation of the structure the two adjusting screws 25 are adjusted in the manner which will now be described.

With the supply valve chamber 131 in the two regulating valve devices 17 and 18 supplied with fluid under pressure from pipe 145 through passage 146, and with the two arms 24 of member 22 extending parallel to the axis of the power piston rod 5, the two screws 25 are turned into engagement with the ends of the respective plungers 19 and then further operated to move said plungers into seating engagement with the respective release valves 135. The screws 25 are then further adjusted to a slight extent to crack open the respective supply valves 130 to allow fluid under pressure to flow from the supply valve chamber 131 to the release valve chambers 133 and thence through passage 147 to chamber 6 at one side of the power piston 4, and at the same time through passages 148 and 149 to chamber 3 at the opposite side of the power piston 4.

The adjustment of both screws 25 may be such as to unseat the supply valves 130 to such an extent as to allow pressure of fluid supplied to the supply valve chambers 131 to equalize into chambers 3 and 6 at opposite sides of the power piston, or in other words, the adjustment may be such as to maintain the supply valves open. However it is preferred that both of the supply valves 130 be unseated to a lesser degree such that when a certain pressure, intermediate that of the atmosphere and that supplied through pipe 145, is otbained on the opposite sides of the power piston, such pressure acting in chambers 133 on the ends of the respective plungers 19 will urge said plungers outwardly sufficiently to allow the two supply valves 130 to seat. With this latter adjustment the supply valves 130 will initially be unseated by screws 25 a very small degree, such for example as one one-thousandths of an inch, under which condition is has been found that both of the supply valves 130 will seat upon obtaining the desired intermediate degree of pressure on opposite sides of the power piston 4.

Whether the adjusting screws 25 are adjusted to hold the supply valves 130 open to permit full supply pressure to be obtained from pipe 145 on opposite sides of the power piston or whether they are adjusted to allow closure of the supply valves upon obtaining the intermediate degree of pressure on opposite sides of the power piston, it will be apparent that substantially the same pressure of fluid will be effective in both pressure chambers 3 and 6 on opposite sides of the power piston 4.

The area of piston 4 subject to pressure of fluid in chamber 6 is less than the area subject to pressure of fluid in chamber 3 by an amount equal to the area of the piston rod 5, and it will therefore be seen that when the pressures of fluid acting on opposite sides of said piston are the same, there will be a slight differential in the opposing forces created on said piston which will tend to move said piston toward the left hand. This differential in forces is less however than the static resistance to movement of the piston and of other parts of the structure which said piston is adapted to move. It will therefore be seen that when the pressures of fluid in chambers 3 and 6 are substantially the same, the piston 4 will be in a static or stationary condition.

With the parts conditioned as just described, it will be noted that a slight degree of rocking of member 22 in a clockwise direction, as viewed in Figs. 1 and 9, will permit operation of the valve device 18 to release fluid under pressure from the power piston chamber 3 and at the same time will actuate the valve device 17 to increase the pressure of fluid in chamber 6, in case it is not already equal to that in the supply pipe 145, for thereby creating a differential in pressures of fluid on the power piston which is effective to move said piston in the direction of the right hand. Rocking of member 22 in a counter-clockwise direction wi'l create an oppositely effective differential in fluid pressures on the power piston to move it toward the left hand. Return of member 22 to its normal position will destroy a differential in fluid pressures on the power piston to cause cessation of movement of said piston, as will be apparent. It will thus be seen that by suitable manipulation of member 22, the power piston 4 can be caused to turn the sprocket wheel 14 in either direction and stop it in desired position at either side of and including its normal position, in which it is shown in the drawing.

Associated with the end of the power cylinder 3 opposite the pressure head 7 is a pilot device 30 for controlling operation of the member 22 to provide differentials in fluid pressures on the power piston 4. The pilot device 30 comprises a casing structure secured to the power cylinder and containing two oppositely and axially arranged flexible diaphragms 31 and 32 having at their respective outer faces pressure chambers 33 and 34 connected to control pipes 35 and 36, respectively. The pipes 35 and 36 may lead to any suitable control valve device (not shown) which is operable to supply fluid at any selected pressure, from zero pressure to a maximum degree to either one of said pipes while maintaining the other pipe open to atmosphere.

The two diaphragms 31 and 32 are connected together for movement in unison by means including a rod 37 and followers 38 and 39 respectively engaging the adjacent faces of said diaphragms. The follower 38 is arranged to engage a shoulder 40 in the casing to limit deflection of the diaphragms in one direction, while a similar shoulder 41 is provided for engagement by follower 39 to limit deflection of the diaphragms in the opposite direction.

Intermediate the two diaphragms 31 and 32, the rod 37 is operatively connected by a pin 42 to a lever 43 one end of which is mounted to turn on a pin 44 secured in the casing structure. The opposite end of lever 43 is connected to one end of a rod 45 projecting from a resistance device 46 secured to the power cylinder 3. The resistance device 46 may contain spring means (not shown) arranged to oppose with increasing pressure, movement of lever 43 in either direction from a neutral position in which it is shown in the drawing, and said spring means is therefore constantly effective to bias said lever toward its neutral position.

It will now be seen that upon supply of fluid through pipe 35 to diaphragm chamber 33 with diaphragm chamber 34 open to atmosphere through pipe 36, the diaphragm 31 will deflect and rock lever 43 in a clockwise direction to a position in which the pressure of resistance means 46 balances the pressure of such fluid. Any selected position of lever 43 at the right-hand side of neutral position may therefore be obtained by the provision of fluid at a suitable pressure in chamber 33. The extreme right-hand position of lever 43 will be obtained by providing fluid in chamber 33 at a pressure sufficient to move the follower 38 into contact with shoulder 40. In a like manner the lever 43 may be moved to any selected position at the left-hand side of its neutral position by providing fluid at a suitable pressure in diaphragm chamber 34. Release of fluid pressure from either chamber 33 or 34, with the other chamber vented, will render the resistance means 46 effective to position the lever 43 in accordance with the reduction in such pressure, while a complete reduction in such pressure to that of the atmosphere will render the resistance device effective to move lever 43 to its neutral position, as will be apparent.

The member 22 disposed between the fluid pressure regulating devices 17 and 18 has an upwardly extending arm 50 in the end of which is a pin 51. An equalizing lever 52 is fulcrumed intermediate its ends on the pin 51. One end of the equalizing lever 52 is pivotally connected to one end of an operating rod 53 which extends through space provided between the resistance device 46 and the power cylinder 3 and which has its opposite end pivotally connected by a pin 54 to lever 43 adjacent its connection with rod 45 projecting from the resistance device 46. The opposite end of the equalizing lever 52 is pivotally connected to one end of a rod 55 the opposite end of which is connected to a pin 56 secured in an arm 57 projecting from the gear sector 11 at the side of the sector fulcrum pin 12 opposite the connection between said sector and piston rod link 9.

The operation of the fluid motor above described is briefly as follows:

Let it be assumed that the various parts of the structure are in the positions shown in Fig. 1 and that is desired to turn the sprocket wheel 14 in a clockwise direction from the neutral position shown in the drawing to a different selected position, which requires movement of power piston 4 in the direction of the right-hand. To accomplish this, fluid at a selected pressure is supplied through pipe 35 to diaphragm chamber 33 which causes deflection of diaphragm 31 and thereby rocking of lever 43 in a clockwise direction to a position corresponding to the pressure of such fluid, assuming such pressure to be less than required to deflect said diaphragm its full travel.

This movement of lever 43 actuates rod 53 to turn lever 52 in a counterclockwise direction about its fulcrum connection with rod 55 which at this time will be held stationary due to the relatively great reluctance to movement of the connected power piston 4. This rocking of lever 52 about its fulcrumed connection with rod 55 therefore rocks lever 50 and member 22 in a clockwise direction which actuates the fluid pressure regulating devices 17 and 18 to create a differential in the pressures of fluid in chambers 3 and 6 which is effective to move said piston in the direction of the right hand, and this movement in turn turns the sprocket wheel 14 out of its neutral position in the direction of the position which it is desired it shall attain.

The power piston 4 may start moving as just described before the diaphragm 31 attains its pressure determined position above mentioned, but after deflection of said diaphragm ceases, the rod 53 and the connected end of equalizing lever 52 become stationary. Continued movement of the power piston 6 relative to diaphragm 31 then acts through the medium of the gear sector 11 and rod 55 to rock the equalizing lever 52 in a counterclockwise direction about its connection with rod 53 and this moves the lever 50 and member 22 back toward their neutral positions. When the neutral position of member 22 is attained the valve devices 17 and 18 will have operated to destroy the differential in fluid pressures on the power piston to cause it to cease moving for thereby stopping sprocket wheel 14 in the position corresponding to the pressure of fluid provided in diaphragm chamber 33.

If it is desired to turn the sprocket wheel 14 further in the same direction to another selected position, the pressure of fluid is increased in chamber 33 to a still higher degree, and the apparatus will again operate as just described to turn said wheel to the new selected position.

On the other hand, if it is desired to turn the sprocket wheel back toward, but to a selected position still out of neutral position, the pressure of fluid in diaphragm chamber 33 may be reduced to the degree corresponding to the new desired position of the sprocket wheel. This reduction in pressure of fluid in chamber 33 permits resistance device 46 to rock lever 43 in a counterclockwise direction and deflect diaphragm 31 to a position corresponding to the reduced pressure of fluid, and this movement of lever 43 transmitted through rod 53 and equalizing lever 52 turns the lever 50 and member 22 in a counterclockwise direction which actuates the valve devices 17 and 18 to create a differential in fluid pressures on the power piston 4 which acts to move said piston toward the left-hand. After the diaphragm 31 obtains the position corresponding to the reduced pressure of fluid in chamber 33, the movement of the power piston then rocks lever 50 and member 22 in a clockwise direction back toward their neutral position. When the neutral position of member 22 is attained, the valve devices 17 and 18 will again have operated to destroy the differential in fluid pressures on the power piston 4 and said piston will cease movement in a position, it will be noted, corresponding to the position of control lever 43 and thus in accordance with the reduced pressure of fluid in diaphragm chamber 33.

A further reduction in the pressure of fluid in chamber 33 will cause the sprocket wheel 14 to assume a corresponding new position back toward its neutral position, while a complete release of fluid under pressure from said chamber will cause said sprocket wheel to be returned to its neutral position, as will be apparent from the above description.

It will now be seen that the sprocket wheel 14 may be caused to assume any desired position at the right-hand side of its neutral position by the provision of fluid at the proper selected pressure in diaphragm chamber 33. The sprocket wheel 14 may also be caused to assume any desired position at the left-hand side of its neutral position by providing fluid at the proper selected pressure in diaphragm chamber 34, in a manner which will be apparent from the above description and which therefore need not be described in greater detail.

For reasons before set forth there is, however, a possibility that piston 4 may not stop in a selected position as above described, but may overtravel the selected position, in which case its direction of movement may be reversed and result in over-travel of said position in the opposite direction. Such over-travel of the power piston would be undesirable and, in accordance with the invention, may be prevented by a dash-pot or stabilizer which will now be described.

In the drawing the stabilizer is indicated generally by the reference numeral 60 and, as shown, comprises a casing 61 secured by bolts or screws 62 to the mounting plate 2 in the space between the follow-up rod 55 and piston rod 5 and between the gear sector 11 and equalizing lever 52.

The casing 61 has two coaxially aligned oppositely extending open-ended bores 63 and 64 separated by a dividing wall 65 and arranged in substantial parallel relation to the piston rod 5, as viewed in Fig. 1 of the drawing. A piston 66 is disposed in bore 63 and an oppositely arranged piston 67 is disposed in bore 64, the two pistons being connected together for movement in unison by a rod 68 extending through a bore in the dividing wall 65 and having a sliding fit with the wall of said bore. The two pistons 66 and 67 have at their adjacent faces pressure chambers 69 and 70 respectively, which are constantly filled with a suitable liquid such as oil whereby the two pistons are constantly opposingly subject to the liquid in said chambers. The two chambers 69 and 70 are constantly in communication with each other through a relatively small port or choke 85 provided through the dividing wall 65. The opposite faces of the two pistons are subject to atmospheric pressure through the open ends of the respective bores.

The piston 66 comprises a piston head 71 having substantial sliding contact with the wall of bore 63 and having an annular groove in which is disposed a resilient ring 72 having sealing and sliding contact with the wall of said bore. Mounted against the face of piston head 71 adjacent the pressure chamber 69 is the central annular portion of a flexible packing cup 73, the peripheral substantially cylindrical portion of which extends into pressure chamber 69 and has sliding sealing contact with the wall of said chamber. A follower 74 is secured against the opposite face of the packing cup 73 by a nut 75 on the piston rod 68.

The piston 67 comprises two rings 76 and 77 which are slidably mounted on a reduced portion of piston rod 68 disposed in bore 64. The ring 76, constituting a follower, is in contact with a shoulder 78 on the piston rod, and clamped between the two rings by a nut 79 having screw-threaded engagement with the rod and engaging the outer face of ring 77 is the central annular portion of a flexible packing cup 80. The packing cup 80 is like the packing cup 73 but oppositely arranged, that is, it has its peripheral sealing portion extending into chamber 70. The ring 77 constitutes a piston head and carries a resilient ring 81 having sealing sliding contact with the wall of bore 64.

The piston 66 carries a pin 82 connecting said piston to one end of link 83. The opposite end of link 83 is connected by a pin 84 to gear sector 11 between the fulcrum pin 12 and the connection with the power piston rod connecting link 9. The two pistons 66 and 67 are therefore arranged to move with the gear sector 11 and power piston 4.

The casing of the stabilizer has a raised part 86 extending upwardly from the dividing wall 65 into an oil reservoir or sump 87 which extends substantially the length of the structure over the piston bores 63 and 64. The length of the raised part 86 is less than the width of the oil reservoir so that said reservoir extends down past the opposite ends of the raised part, as shown in Fig. 8 of the drawing. One or more openings closed by screw-threaded plugs 88 are provided for filling the reservoir 87 with oil.

The raised portion 86 in the casing has a through bore arranged at right angles to the stabilizer piston rod 68 and into this bore is pressed a bushing 90. A plug valve 91 is mounted to rotate in bushing 90. The end of this valve adjacent the mounting plate 2 contacts the inner face of a plug 92 secured in and closing an opening in the casing. The opposite end of the valve 91 bears against the inner face of a plug 93 secured in and closing another opening in the casing. The valve 91 is provided with an operating shaft 94 which extends through a central bore in the plug 93 to the exterior of the casing, and on the outer end of this shaft is secured one end of an operating arm 95. The opposite end of arm 95 is connected to one end of an operating rod 96 the opposite end of which rod is connected to an arm 97 secured by a pin 98 to the end of shaft 20 projecting beyond one of the brackets 21. This structure provides for rotating the plug valve 91 in bushing 20 upon the rocking of member 22 by lever arm 50. Within the nut 93 is an annular groove encircling the shaft 94 and containing a resilient ring 99 providing a seal between said shaft and nut to prevent leakage of oil from the reservoir 87.

The raised portion 86 of the casing is provided with four spaced annular grooves 100, 101, 102 and 103 encircling and open to the outer surface of the bushing 90. The central grooves 100 and 101 are disposed one on either side of the longitudinal center of the bushing, while the grooves 102 and 103 are located one adjacent each of the opposite ends of said bushing. The groove 102 is open through one or more bores 105 to pressure chamber 69, and groove 100 is also open to said chamber through one or more bores 106. The grooves 101 and 103 are open to pressure chamber 70 through one or more bores 107 and 108, respectively.

The bushing 90 has two diametrically opposite ports 109 connecting its interior to the groove 100, and two other aligned ports 110 connecting its interior to groove 102. Diametrically opposite pairs of ports 111 and 112, arranged 90° from ports 109 and 110, connect the interior of the bushing 92 to grooves 101 and 103, respectively.

In the portion of valve 91 extending over the two middle grooves 100 and 101 and over ports 109 and 111, are four cavities 115, equally spaced from each other around the valve and connected together by cross ports 116. These cavities extend longitudinally of the valve and are of such a length as to connect ports 109 and 111 under conditions to be later described, but their width is such that between each two adjacent cavities there is a peripheral portion 117 of the valve in contact with the wall of the bushing, which peripheral portion is slightly wider than ports 109 or 111.

With the valve 91 in the neutral position shown in Figs. 5 and 6 of the drawings, two opposite peripheral portions 117 cover ports 109, while the other peripheral portions 117 cover the ports 111, thereby closing communication between the ports 109 and 111 and thus between the two pressure chambers 69 and 70. The turning of valve 91 in either direction from neutral position to a slight degree will open communication between ports 109 and two oppositely arranged cavities 115, and will also open ports 111 to the other two cavities 115, and since all of the cavities 115 are connected together by the cross ports 116, the opening of this communication will allow flow of liquid from one of the pressure chambers 69 or 70 to the other depending upon the direction of movement of the stabilizer pistons 66 and 67. The flow capacity of this communication will vary according to the extent of movement of the valve 91 out of neutral position in either direction, which governs the degree of opening between ports 109 and 111 and cavities 115, and will be gradually reduced as the valve is turned toward neutral position and completely closed just ahead of attaining said position. All of the ports 109 and 110, 111 and 112 are relatively long, in the direction of the length of the bushing 90, as compared to their width, so as to provide a relatively large degree of opening of the communication above described for a slight movement of the valve out of neutral position and to also maintain a relatively large degree of opening and thus a relatively low resistance to flow of liquid between the two pressure chambers, until the valve is returned substantially to its neutral position.

In operation, when fluid under pressure is supplied to deflect either diaphragm 31 or 32, the rocking of lever 43 equalizing lever 52 and lever 59 will also rock lever 97 and through rod 96 the operating arm 95 to turn the valve 91 out of neutral position in either one direction or in the opposite direction. This turning of valve 91 opens communication between pressure chambers 69 and 70 by way of ports 109 and 111, cavities 115 and cross ports 116 in the valve, so that upon subsequent movement of the power piston 4 and thereby of the stabilizer pistons 66 and 67, liquid displaced by one or the other of said pistons, depending upon the direction of their movement with the power piston 4, may with a relatively great degree of freedom flow out of the respective pressure chamber 69 or 70 and into the other pressure chamber, so that the stabilizer pistons will not exert any undue force opposing movement of the power piston 4.

As the power piston 4 then continues to move toward its selected position, it acts, through equalizing lever 52 and levers 59 and 97, to turn the plug 91 back toward its neutral position, and the plug valve will attain its neutral position at the time the power piston attains the position in which it is intended to stop. Due to the shape of ports 109 and 111 in the bushing, relatively free flow of liquid from the one pressure chamber to the other will however contine until just before the valve attains its neutral position in which further flow of liquid will be prevented.

It will thus be seen that since the valve 91 allows relatively free flow of liquid from one pressure chamber 69 or 70 to the other until said valve is substantially turned to its neutral position, the power piston 4 will be able to move promptly and without undue resistance from the stabilizer substantially to its new or selected position. After the valve 91 is closed the liquid will however continue to flow from one pressure chamber to the other through the choke 85. The flow capacity of this choke is, however, such as to offer relatively great resistance to the flow of oil from one pressure chamber to the other, so that as soon as the valve 91 is returned to substantially its neutral position, a relatively high oil pressure will develop on the stabilizer piston 66 or 67 which is displacing oil, to promptly snub the power or piston 4, or, in other words, to oppose the actuating force on the power piston and decelerate the rate of movement thereof and thus absorb substantially all of its inertia and that of the connected parts. After the power piston is thus brought to a substantial stop continued movement will occur only at a rate determined by choke 85 and which will be sufficiently slow to allow operation of the valve device or devices 17 or 18 to destroy the differential in pressures on the power piston by the time said piston moves into the position in which it is intended to stop, so that accurate positioning of said piston will occur, without over-travel or possible oscillation.

It will be apparent that without the use of choke 85 the closing of the communication between chambers 69 and 70 by the valve 91 would completely bottle up the liquid in both of said chambers which would cause sudden stopping of the stabilizer pistons and of the power piston 4 and this could result in damage to or breakage of the structure. The choke 85, however, avoids the development of damaging shocks, but at the same time creates a force for opposing movement of the power piston which reduces the rate of movement of said piston to a sufficiently low degree to obtain accurate stopping thereof in the desired position.

It will be apparent that the stabilizer will operate in the manner just described upon each operation of the pilot device 30 and regardless of the direction or extent of desired movement of the power piston 4.

Adjacent the plug 92 the valve 91 is provided with two diametrically opposite cavities 120 for registration with ports 110, and each cavity is connected by a groove 121 extending out past the end of the bushing to the oil reservoir 87, whereby oil from said reservoir will be constantly present in said cavities. Similar cavities 122 are provided in the valve adjacent the opposite end of the bushing for registration with ports 112, and each of these cavities is also connected to the oil reservoir 87 through a groove 123 provided in the valve and extending out past the end of the bushing.

The valve 91 is so disposed in bushing 90 that with the operating arm 95 in its neutral position as shown in Fig. 1 the ports 110 and 112 in said bushing will be closed by said valve. Rotation of the valve 91 in a counterclockwise direction, as viewed in Fig. 1 or in Figs. 4 to 7, as will occur upon movement of the diaphragm operated lever 43 in the direction of the right-hand to effect movement of the power piston in the same direction, will maintain the ports 110 closed by said valve, but at the opposite end of the valve the cavities 122 will be moved into registry with the diametrically opposite ports 112 in the bushing so as to thereby open the oil reservoir 87 to the pressure chamber 70 into which oil is displaced by the stabilizer piston 66 during such operation. Thus during movement of the power piston 4 toward the right hand, the pressure chamber 70 will not only receive the oil displaced by piston 66 from chamber 69, but will also be capable of receiving oil from the oil reservoir 87 as the piston 67 is moved away from the dividing wall 65. The purpose of this is to insure that chamber 70 will be maintained completely filled with oil during movement of the piston 67 away from the dividing walls 65 so as to prevent a partial vacuum being created in said chamber which would tend to allow air from the atmosphere to creep past the packing cup 80 into said chamber. The packing ring 81 is also provided as a further safe-guard against the entrance of air from the atmosphere to chamber 70 under this condition.

Now in case the valve 91 is turned in a clockwise direction from neutral position, as would occur upon operation of the structure to effect movement of the power piston 4 in the direction of the left-hand, said valve will maintain the ports 112 in the bushing closed, while the ports 110 will be opened to cavities 120 in the valve and thus to the oil reservoir, so that as the stabilizer piston 67 acts to displace oil from pressure chamber 70 to chamber 69, oil will also be capable of flowing from the oil reservoir to the latter chamber in order to maintain it completely filled with oil and thus minimize the possibility of air entering said chamber past the piston 66. The sealing ring 72 is provided on piston 66 as an added safe-guard against the entrance of air to chamber 69.

It will be noted that all oil displaced by either of the stabilizer pistons 66 or 67, depending upon the direction of their movement, is forced into the space created by movement of the other piston away from the dividing wall 65 and this amount of oil should theoretically fill said space, but in case it fails to do so, the creation of a partial vacuum in said space is prevented by opening said space to the oil reservoir which, in addition to the sealing ring 81 or 72, ensures that air will not enter either pressure chamber 69 or 70.

In fluid motors of the type above described there is always a possibility of leakage of fluid under pressure from the different pipes and chambers such as chambers 3 and 6 at opposite sides of the power piston 4. If for instance there should be leakage of fluid under pressure from chamber 6 with the adjusting screws 25 adjusted to permit closure of the supply valves 130 with the arms 24 in their neutral positions, such leakage would cause a differential to develop between the pressures of fluid in chambers 6 and 3, and when this differential becomes sufficient the piston would start moving toward the left hand. This movement would then actuate the valve device 17 to supply fluid under pressure to chamber 6 and at the same time would allow operation of the valve device 18 to release fluid under pressure from chamber 3 which would not only destroy the operating differential but would also create an oppositely acting differential to move the power piston back to the selected position in which the opposing pressures would again be equalized. Continued leakage would then cause the piston to again move toward the left hand slightly and then back to the selected position. In case the leakage were from chamber 3, the power piston would tend to move from the selected position toward the right hand and then back to its selected position.

This possible oscillatory movement of the power piston due to leakage is relatively small. For example with a leverage multiplication of ten between the supply valves 130 and power piston, and with the supply valves 130 adjusted to limit the pressure in pressure chambers 3 and 6 to an intermediate degree, approximately one thousandth inch movement of the screws 25 in either direction from their neutral position is adequate to control operation of the fluid pressure regulating devices 17 and 18 to limit the extent of oscillatory movement of the power piston to approximately three-sixteenths of an inch. It is however desirable that this oscillation of the power piston be opposed by high resistance to insure against over-travel as might tend to occur in case the device being controlled were to exert a force biasing the power piston out of a selected condition. In order to provide this high resistance, I maintain the liquid flow communication controlled by valve 91 closed during oscillation of the power piston incident to leakage of fluid under pressure, as just described, such closure being obtained preferably by making the peripheral portions 117 of the valve 91 wider than the ports 109 and 111. Thus while the power piston may move in case of leakage of fluid under pressure sufficiently to actuate the valve devices 17 and 18 to cause said piston to move back to its selected position, the valve 91 will maintain closed its liquid flow communication between chambers 69 and 70 and thus so dampen movement of the power piston that it will not move further than actually required for operating the valve devices 17 and 18 to stop said piston and cause it to return to its selected position.

The difference in width between the peripheral portions 117 of the valve 91 and the ports 109 and 111 required to accomplish the result just described is however so small as not to interfere to any material extent with prompt movement of the power piston to any selected position in response to a change in pressure on either pilot diaphragm 31 or 32.

*Summary*

From the above description it will now be seen that the improved hydraulic stabilizer is effective to insure stopping of a power member, such as the power piston 4, in a definite selected position without damaging shock. The structure of the stabilizer is such as to allow relatively free movement of the power piston substantially from one position to another or selected position in which it is desired that it shall stop. As the power piston substantially attains the selected position the stabilizer acts to provide a force for opposing further movement of said piston and said force so reduces the rate of piston movement as to insure the destruction of the actuating differential in fluid pressures on the piston when it obtains the position in which it is desired to stop same, so that further movement of the piston will be effectively prevented. In case of leakage of fluid under pressure from either power piston chamber, the resulting oscillatory movement of the piston does not open the valve controlled liquid flow communication in the stabilizer, so that the stabilizer remains effective to oppose and prevent any material change in the selected position of the power piston. The structure is so designed as to insure against the entrance of air into the pressure chambers which might materially interfere with or even destroy its stabilizing action.

Having now described my invention, what I claim as new and desire to secure by Letters Patent, is:

1. In combination, a fluid motor comprising piston means subject to opposing fluid pressure in two chambers and being movable upon establishing a differential between said pressures, regulating valve means for controlling the pressure of fluid in said chambers, control means operable to effect operation of said regulating valve means to establish said differential in fluid pressures, said piston means being operable upon movement relative to said control means to effect operation of said regulating valve means to destroy said differential in fluid pressures, stabilizer means comprising movable abutment means opposingly subject to liquid in two liquid filled control chambers, a constantly open restricted communication connecting said control chambers, means connecting said abutment means to move with said piston means, valve means operable to open and close a liquid flow communication between said control chambers, and actuating means for controlling said valve means operable to actuate said valve means to open said liquid flow communication upon operation of said regulating valve means to establish said differential in fluid pressures on said piston means and operable to actuate said valve means to close said liquid flow communication upon operation of said regulating valve means to destroy said differential.

2. In combination, a fluid motor comprising piston means subject to opposing fluid pressures in two chambers and being movable upon establishing a differential between said pressures, regulating valve means for controlling the pressure of fluid in said chambers, movable abutment means opposingly subject to liquid in two liquid filled control chambers, means operable upon movement of said piston means to actuate said abutment means to displace liquid from one of said control chambers to the other, a constantly open restricted communication connecting said control chambers, control valve means controlling a liquid flow communication between said control chambers, pilot means operable to operate said regulating valve means and said control valve means in unison to provide, respectively, a differential in fluid pressures on said piston means and to open said liquid flow communication, and means operable by said piston means upon movement relative to said pilot means to effect operation of said regulating valve means to destroy said differential in fluid pressures on said power piston and to at substantially the same time effect operation of said control valve means to close said liquid flow communication.

3. In combination, a fluid motor comprising piston means subject to opposing fluid pressures in two chambers and being movable upon establishing a differential between said pressures, regulating valve means for controlling the pressure of fluid in said chambers, movable abutment means opposingly subject to liquid in two liquid filled control chambers, means operable upon movement of said piston means to actuate said abutment means to displace liquid from one of said control chambers to the other, a constantly open restricted communication connecting said control chambers, control valve means controlling a liquid flow communication between said control chambers, pilot means operable to operate said regulating valve means and said control valve means to provide respectively a differential in fluid pressures on said piston means and to open said liquid flow communication, means operable by said piston means upon movement relative to said pilot means to effect operation of said regulating valve means to destroy the differential in fluid pressures on said power piston and to at substantially the same time effect operation of said control valve means to close said liquid flow communication, a liquid reservoir disposed above said control chambers, said control valve means being also operable upon opening said liquid flow communication, to open to said reservoir the one of said control chambers receiving liquid from the other control control chamber, whereby liquid may also flow from said reservoir to the said one control chamber.

ARTHUR G. LARSON.

REFERENCES CITED

The following references are of record in the file of this patent:

UNITED STATES PATENTS

| Number  | Name      | Date          |
|---------|-----------|---------------|
| 250,103 | Reynolds  | Nov. 29, 1881 |
| 259,538 | Henszey   | June 13, 1882 |
| 333,831 | Corliss   | Jan. 5, 1886  |
| 396,108 | Nickerson | Jan. 15, 1889 |
| 505,764 | Harden    | Sept. 26, 1893|
| 528,275 | Martin    | Oct. 30, 1894 |
| 756,831 | Clarke    | Apr. 12, 1904 |
| 887,517 | Raub      | May 12, 1908  |

FOREIGN PATENTS

| Number | Country       | Date |
|--------|---------------|------|
| 8,274  | Great Britain | 1915 |